United States Patent [19]
Shimizu

[11] Patent Number: 5,175,652
[45] Date of Patent: Dec. 29, 1992

[54] IMAGING OPTICAL SYSTEM
[75] Inventor: Yoshiyuki Shimizu, Miura, Japan
[73] Assignee: Nikon Corporation, Tokyo, Japan
[21] Appl. No.: 733,464
[22] Filed: Jul. 22, 1991
[30] Foreign Application Priority Data
  Aug. 6, 1990 [JP] Japan .................. 2-208426
[51] Int. Cl.⁵ .................. G02B 21/02; G02B 9/04
[52] U.S. Cl. .................. 359/793; 359/656; 359/785
[58] Field of Search .............. 359/656, 660, 661, 779, 359/784, 785, 793-795, 715, 717

[56] References Cited
U.S. PATENT DOCUMENTS

| | | | |
|---|---|---|---|
| 3,905,686 | 9/1975 | Ruben | 359/785 |
| 4,449,794 | 5/1984 | Yamada | 359/779 |
| 4,491,394 | 1/1985 | Matsubara | 350/414 |
| 4,531,815 | 7/1985 | Konno et al. | 359/661 |
| 4,955,709 | 9/1990 | Kataoka et al. | 359/795 |
| 4,984,877 | 1/1991 | Ito | 359/795 |

FOREIGN PATENT DOCUMENTS
63-311222 12/1988 Japan .

Primary Examiner—Rodney B. Bovernick
Assistant Examiner—James Phan
Attorney, Agent, or Firm—Shapiro and Shapiro

[57] ABSTRACT

An imaging optical system has a first objective lens movable along the optical axis thereof for focus adjustment and for forming the image of an object at infinity, and a second objective lens for forming the image again at a predetermined position at a predetermined magnification. The second objective lens comprises, in succession from the object side, a positive single lens, a negative single lens and a positive single lens disposed with an air space therebetween, and satisfies the following conditions:

$0.05f < \Sigma d < 0.14f$

$0.1f < |r_M| < 0.35f$ $0.01f < D < 0.11f$ where f is the focal length of the second objective lens, $\Sigma d$ is the assembly length of the second objective lens, $r_M$ is the radius of curvature of that surface of the lenses constituting the second objective lens which has the greatest positive power, and D is the total of the air spaces between the two positive single lenses and middle negative single lens of the second objective lens.

14 Claims, 7 Drawing Sheets

IMAGING OPTICAL SYSTEM

BACKGROUND OF THE INVENTION

1. Field of the Invention

This invention relates to an imaging optical system for use in the objective lens of a microscope or the like, and particularly to an infinity system imaging optical system comprising two portions and forming the image of an object at infinity by a first lens portion movable along the optical axis for focus adjustment, and again forming this image at a predetermined location at a predetermined magnification by a second lens portion.

2. Related Background Art

Figure 13:
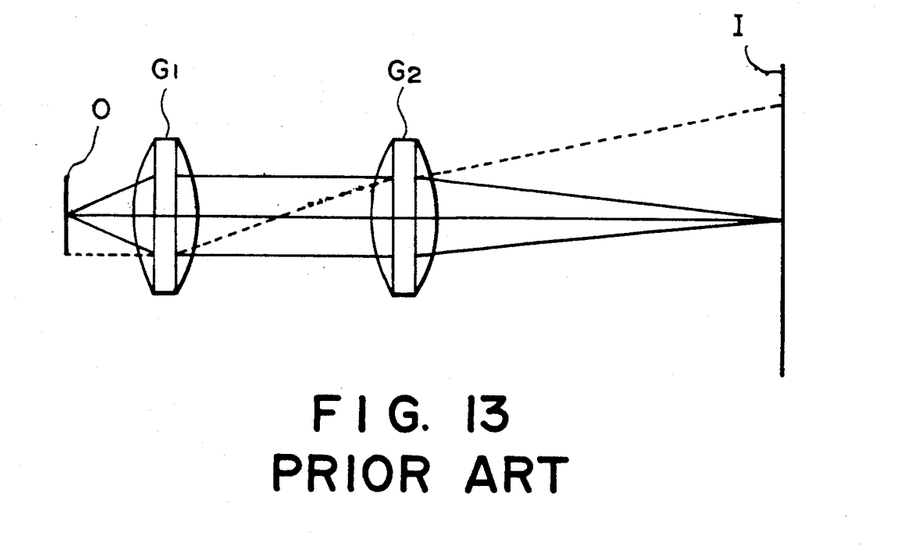
FIG. 13 is an optical path view showing the basic construction of a conventional infinity system imaging optical system.

This invention relates to the construction of a re-imaging lens (or a second objective lens or a collimator lens) when, in a so-called infinity system imaging optical system known in a microscope or the like, a first objective lens is moved in the direction of the optical axis for focus adjustment. The infinity system imaging optical system, as shown in FIG. 13 of the accompanying drawings, comprises a first objective lens $G_1$ and a second objective lens $G_2$, and forms the image of an object surface 0 at infinity by the first objective lens $G_1$, and again forms that image at a predetermined magnification on the image plane I. The second objective lens in such an infinite system imaging optical system is known, for example, from Japanese Patent Publication No. 61-61650 or Japanese Laid-Open Patent Application No. 63-311222.

Now, in the conventional infinity system imaging optical system, focus adjustment is accomplished by the entire optical system being moved relative to an object, and any system in which focus adjustment is accomplished by only the first objective lens being moved has not yet been proposed.

Moreover, the conventional second objective lens is comprised of four lens units, as seen, for example, the above-mentioned Japanese Laid-Open Patent Application No. 63-311222.

SUMMARY OF THE INVENTION

The present invention intends to provide an infinity system imaging optical system in which only a first objective lens is movable along the optical axis for focus adjustment and wherein a second objective lens is comprised of three lens units and even if the entrance pupil is moved with the movement of the first objective lens, a performance equal to or higher than that in the case of the conventional four-lens construction is achieved.

Figure 14:
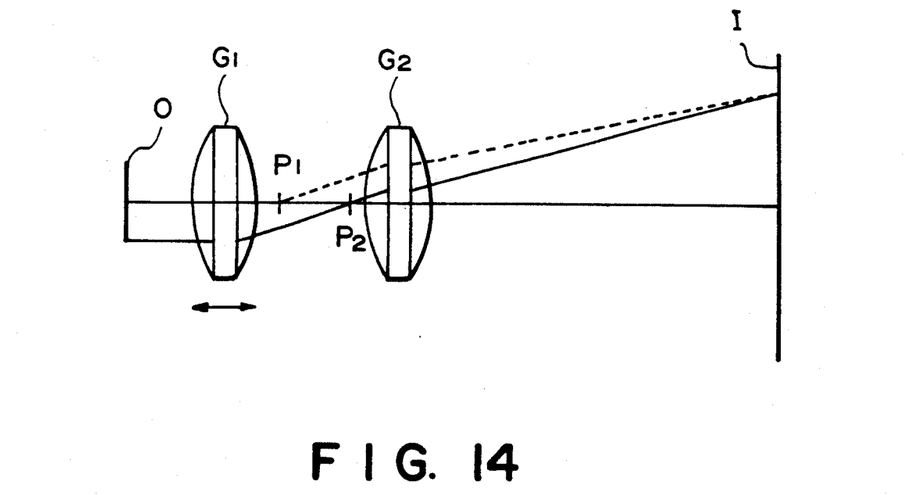
FIG. 14 is an optical path view showing the change of the pupil position when the spacing between the first and second objective lenses of the infinity system imaging optical system is varied.

As shown in FIG. 14 of the accompanying drawings, if in the infinity system imaging optical system, the first objective lens $G_1$ is moved for focus adjustment when the object surface varies, the spacing been the first objective lens $G_1$ and the second objective lens $G_2$ will vary and along therewith, the position of the pupil will also change from $P_1$ to $P_2$. Therefore, the position of the principal light ray of the second objective lens $G_2$ will also change. Accordingly, the second objective lens $G_2$ need be small in aberrations even if the position of the entrance pupil fluctuates. For that purpose, the second objective lens $G_2$ must be constructed an astigmatically.

Now, an anastigmat comprising three positive, negative and positive lens units is known as a triplet type lens, but in that case, the lens assembly length (the length from the vertex of the foremost lens surface to the vertex of the last lens surface) usually has a value equal to or greater than 20% to 30% of the focal length. This is attributable to the fact that it is considered to be necessary in order to widen the spacing between surfaces having positive and negative powers to thereby approximate Petzval sum to zero, and correct curvature of image field and provide an anastigmat. The Petzval sum of a lens of this type is about 0.3 when the focal length thereof is 1. An optical system which comprises three positive, negative and positive lenses as described above and in which the space between the lenses is sufficiently small as compared with the focal length is known as an objective lens for a microscope or an objective lens similar thereto, but these cannot singly be an anastigmat for the reason set forth above, and are utilized as an achromat or an apochromat. The Petzval sum of such achromat of three-lens construction often exceeds 0.65, but it is known that this is substantially coincident with the Petzval sum of a thin lens and very little consideration is paid to make it an anastigmat. Also, lenses of these types give priority to the correction of spherical aberration and therefore, the radius of curvature of the first surface of the lens is often greater than ⅓ of the focal length and the absolute values of the radii of curvature of the other surfaces are rarely less than ⅓ of the focal length (but this does not apply to apochromats which give priority to the correction of chromatic aberration, because they differ in meaning). Therefore, the action of a surface (concave surface) having negative power which is included in the lens is weak, and the action of correcting curvature of image field as well as spherical aberration is small.

When an attempt is made to utilize triplet lenses of these two types as a second objective lens of an infinity system imaging optical system, a first triplet anastigmat is too great in assembly length and needs an extra space for it to be incorporated, for example, into a portion of a microscope optical system, and this is physically disadvantageous. Also, a second achromat type triplet is advantageous in terms of space, but cannot correct curvature of image field in the negative direction and has a disadvantage in optical performance attributable to aberrations.

The present invention has been made in view of the disadvantages peculiar to the lens systems of these two types, and the object thereof is to provide an infinity system imaging optical system provided with a second objective lens capable of sufficiently standing use from the viewpoints of space for focus adjustment or the like and aberrations.

Description will first be made of properties with which the second objective lens should be endowed. In the second objective lens of the infinity system imaging optical system intended by the present invention, the required numerical aperture is usually of the order of 0.05 (F-number 10) or less, and it is desirable that curvature of image field be sufficiently corrected within this range. It is necessary that at least the meridional image plane be corrected (because the remaining aberrations of the sagittal image plane are negated by a first objective lens and can be negated by the optical system as a whole), but in the present invention, in order that the space between the first objective lens and the second objective lens may be endowed with a degree of freedom to make the first objective lens movable for focus adjustment and that the fluctuation of the entrance pupil resulting from this movement may be coped with, it is necessary that not only the meridional image plane but also coma be sufficiently corrected.

For the reason set forth above, the second objective lens must be of a lens form having the performance of an anastigmat or a performance approximate thereto. As previously described, the full length of a triplet anastigmat is often of the order of 0.3 f or more. This has been considered to be a size necessary to approximate Petzval sum of zero and obtain necessary conditions as an anastigmat, but in the present invention, in order to move the first objective lens so as to be close to the second objective lens, it is desirable that the assembly length of the second objective lens be as small as possible. Therefore, in the infinity system imaging optical system of the present invention, the second objective lens is comprised of three positive, negative and positive lenses, and is constructed so that when the focal length thereof is f, the lens assembly length thereof may satisfy $$0.05\,f < \Sigma d < 0.14\,f. \quad (1)$$

The reason why in the above-mentioned condition (1), the lower limit is set up is that if the lens assembly length is less than that, the second objective lens itself will not completely correct its curvature of image field even if a condition is otherwise set, and the curvature of image field cannot be sufficiently corrected even if the second objective lens is combined with the first objective lens. Also, the reason why the upper limit is set up is that if the second objective lens becomes longer than that, the distance between the first objective lens and the second objective lens cannot be secured sufficiently and the distance for focus adjustment and the space for the insertion of optical members such as a filter and a half-mirror for downward illumination will be deficient and the space for the insertion of a prism or the like for a double eyepiece will be deficient on the rear side of the second objective lens and the full length of the optical system will become too great.

Also, when the radius of curvature of that surface of the lenses constituting the second objective lens which has the greatest positive power is $r_M$ and the total of the air spaces between the two positive lenses and the middle negative lens is D and the focal length of the second objective lens is f, the second objective lens must have the following relations:

$$0.1\,f < |r_M| < 0.35\,f \quad (2)$$

$$0.01\,f < D < 0.11\,f \quad (3)$$

The above conditions (2) and (3) will hereinafter be described. Generally, a lens system is of such structure that positive power is negated by other negative power. At this time, the aberrations of a surface having positive power are negated by the aberrations of a surface having negative power and thus, the lens system as a whole keeps a good corrected state. There are various influences of the spacing between positive power and negative power imparted to aberrations, and generally, for the correction of curvature of image field including Petzval sum, a certain degree of spacing is necessary as seen in a field flattener having negative power. In the case of an ordinary triplet, the total of the spaces before and behind a negative lens is of the order of 0.2 f, and this value tends to become greater with a decrease in the necessary angle of view. Where as in the present invention, it is necessary to make the full length of the second objective lens small and moreover the second objective lens is an anastigmat, it is necessary to make Petzval sum small while keeping this spacing small. For this purpose, it is necessary to make the powers of the positive and negative lenses great and make the space great in effect and make Petzval sum small. Condition (2) is necessary for this purpose, and if $r_M$ exceeds the upper limit of this condition, the assembly length will become great and exceed the upper limit of condition (1). There is the possibility of the performance as a lens system being improved, but where the lens system is used with a series of optical systems incorporated between the first objective lens and the second objective lens, the physical size thereof will become disadvantageous and the gap for focus adjustment by the first objective lens will be deficient. Also, if the lower limit of condition (2) is exceeded, the radius of curvature will become too small and this will become disadvantageous in terms of aberrations. Particularly, in the positive lens forward of the second objective lens, the entrance pupil lies forwardly of the lens and therefore, the angle of incidence of light rays will become great, and this tendency will increase. Condition (3), coupled with condition (2), is necessary for correcting the image plane while keeping the assembly length at a small value. That is, when light travels through a medium of refractive index n, the geometrical optical path length is 1/n. Accordingly, if the refractive index of the medium is greater, the substantial optical path length will become shorter. Accordingly, in an optical system like the present invention wherein it is necessary to make the full length shorter than a predetermined length, it is advisable to make the center thickness of each lens as small as possible and make the air space optically more great within allowed physical dimensions. If the upper limit of condition (3) is exceeded, the center thickness and edge thickness of each lens will become small, and this will make working unstable and will thus adversely affect the performance. If the lower limit of condition (3) is exceeded, the correction of the image plane will become difficult.

As described above, the infinity system imaging optical system of the present invention is an infinity system imaging optical system having a first objective lens movable along the optical axis thereof for focus adjustment and for forming the image of an object at infinity, and a second objective lens for forming said image again at a predetermined position at a predetermined magnification, characterized in that said second objective lens comprises, in succession from the object side, a positive single lens, a negative single lens and a positive single lens disposed with an air space therebetween, and satisfies the following conditions:

$$0.05\,f < \Sigma d < 0.14\,f \quad (1)$$

$$0.1\,f < |r_M| < .35\,f \quad (2)$$

$$0.01\,f < D < 0.11\,f \quad (3)$$

where f is the focal length of said second objective lens, $\Sigma d$ is the assembly length thereof, $r_M$ is the radius of curvature of that surface of the lenses constituting said second objective lens which has the greatest positive power, and D is the total of the air spaces between the two positive single lenses and middle negative single lens of said second objective lens.

In the infinity system imaging optical system according to the present invention, particularly the assembly length of the second objective lens is small and moreover, various aberrations are well corrected.

Therefore, the space required by the second objective lens itself is small and correspondingly more space can be provided for other members, and the movement space for the focus adjustment of the first objective lens can be provided sufficiently. Also, various aberrations, particularly, meridional and coma are well corrected and therefore, the fluctuations of the aberrations caused by the fluctuation of the entrance pupil resulting from focus adjustment are small, and the infinity system imaging optical system of the present invention can practically sufficiently stand a fluctuation 0.4 or more times as great as the focal length. Of course, this value tends to increase with a decrease in the angle of view required.

BRIEF DESCRIPTION OF THE DRAWINGS

FIGS. 1 to 12 are cross-sectional views of embodiments of the second objective lens of an infinity system imaging optical system according to the present invention.

DETAILED DESCRIPTION OF THE PREFERRED EMBODIMENTS

Some embodiments of a second objective lens constituting the infinity system imaging optical system of the present invention will hereinafter be described with reference to the drawings. FIGS. 1 to 12 are cross-sectional views of Embodiments 1 to 12, and the second objective lenses of these embodiments each comprise a positive single lens L1, a negative single lens L2 and a positive single lens L3.

In the following embodiments, f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

Figure 1:
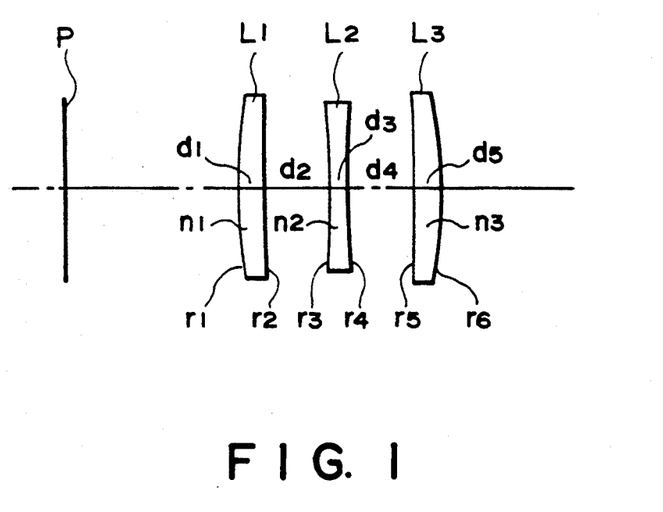

(Embodiment 1)
f = 100 y = 10.5 ENP = 0~ −0.2 f

| | | | |
|---|---|---|---|
| r1 = 28.7 | | | |
| | d1 = 1.5 | n1 = 1.744 | V1 = 45.0 |
| r2 = 136.2 | | | |
| | d2 = 3.83 | | |
| r3 = −40.29 | | | |
| | d3 = 1.0 | n2 = 1.6727 | V2 = 32.17 |
| r4 = 40.29 | | | |
| | d4 = 3.83 | | |
| r5 = −136.2 | | | |
| | d5 = 1.5 | n3 = 1.744 | V3 = 45.0 |
| r6 = −28.7 | | | |
| | Σd = 11.66 | | |

Figure 2:
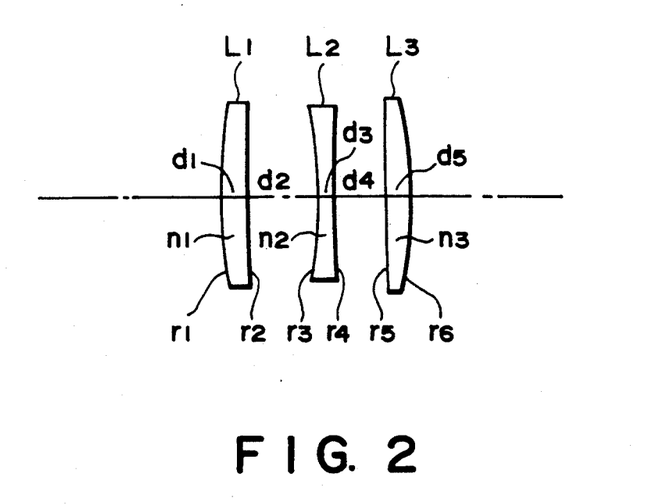

(Embodiment 2)
f = 100 y = 10.5 ENP = 0~ −0.3 f

| | | | |
|---|---|---|---|
| r1 = 29.66 | | | |
| | d1 = 1.5 | n1 = 1.6223 | V1 = 53.05 |
| r2 = 110.45 | | | |
| | d2 = 3.9 | | |
| r3 = −28.39 | | | |
| | d3 = 1.0 | n2 = 1.57501 | V2 = 41.42 |
| r4 = 45.07 | | | |
| | d4 = 3.02 | | |
| r5 = −1023.8 | | | |
| | d5 = 1.5 | n3 = 1.62041 | V3 = 60.41 |
| r6 = −238.56 | | | |
| | Σd = 10.92 | | |

Figure 3:
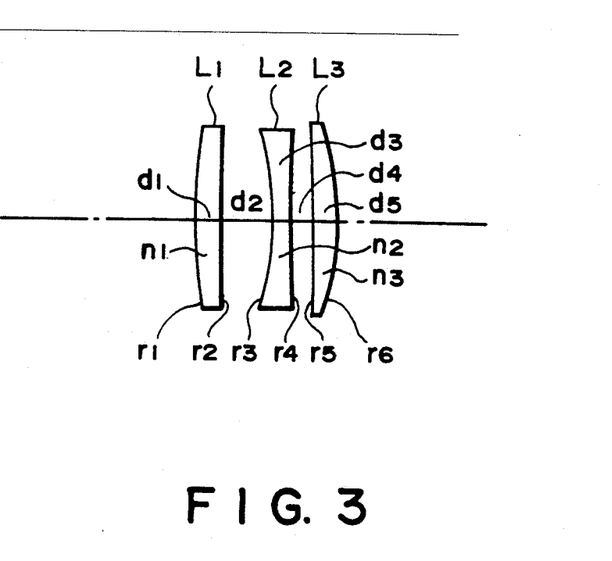

(Embodiment 3)
f = 100 y = 10.5 ENP = 0~ −0.25 f

| | | | |
|---|---|---|---|
| r1 = 28.3 | | | |
| | d1 = 1.5 | n1 = 1.62299 | V1 = 58.22 |
| r2 = 119.3 | | | |
| | d2 = 2.87 | | |
| r3 = −17.19 | | | |
| | d3 = 1.0 | n2 = 1.61266 | V2 = 44.41 |
| r4 = 72.28 | | | |
| | d4 = 1.18 | | |
| r5 = −94.2 | | | |
| | d5 = 1.5 | n3 = 1.62299 | V3 = 58.22 |
| r6 = −15.29 | | | |
| | Σd = 8.05 | | |

(Embodiment 4)
f = 100 y = 10.5 ENP = 0~ −0.3 f

| | | | |
|---|---|---|---|
| r1 = 14.05 | | | |
| | d1 = 1.5 | n1 = 1.51823 | V1 = 58.9 |
| r2 = 27.45 | | | |
| | d2 = 1.99 | | |
| r3 = −56.18 | | | |
| | d3 = 1.0 | n2 = 1.61266 | V2 = 44.41 |
| r4 = 18.7 | | | |
| | d4 = 1.6 | | |
| r5 = 46.6 | | | |
| | d5 = 1.5 | n3 = 1.6228 | V3 = 57.03 |
| r6 = −31.9 | | | |
| | Σd = 7.59 | | |

Figure 5:
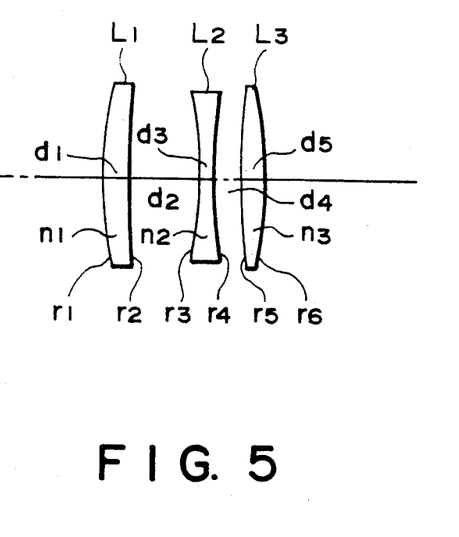

(Embodiment 5)
f = 100 y = 10.5 ENP = 0~ −0.3 f

| | | | |
|---|---|---|---|
| r1 = 20.06 | | | |
| | d1 = 1.5 | n1 = 1.6223 | V1 = 53.05 |
| r2 = 40.63 | | | |
| | d2 = 4.0 | | |
| r3 = −32.32 | | | |
| | d3 = 1.0 | n2 = 1.61266 | V2 = 44.41 |
| r4 = 25.09 | | | |
| | d4 = 1.51 | | |
| r5 = 44.46 | | | |
| | d5 = 1.5 | n3 = 1.51835 | V3 = 60.23 |
| r6 = −22.28 | | | |
| | Σd = 9.51 | | |

Figure 6:
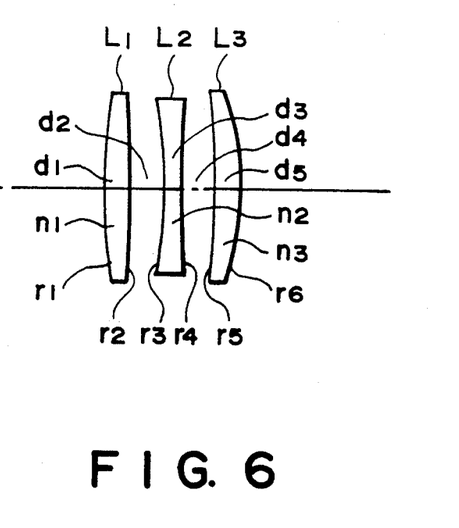

(Embodiment 6)
f = 100 y = 10.5 ENP = 0~ −0.2 f

| | | | |
|---|---|---|---|
| r1 = 34.42 | | | |
| | d1 = 1.5 | n1 = 1.6228 | V1 = 57.03 |
| r2 = −55.11 | | | |
| | d2 = 1.97 | | |
| r3 = −17.53 | | | |
| | d3 = 1.0 | n2 = 1.61266 | V2 = 44.41 |
| r4 = 64.18 | | | |
| | d4 = 1.95 | | |

-continued (Embodiment 6)
f = 100 y = 10.5 ENP = 0~ −0.2 f

| | | | |
|---|---|---|---|
| r5 = −32.39 | | | |
| | d5 = 1.5 | n3 = 1.51835 | V3 = 60.23 |
| r6 = −13.62 | | | |
| | Σd = 7.92 | | |

Figure 7:
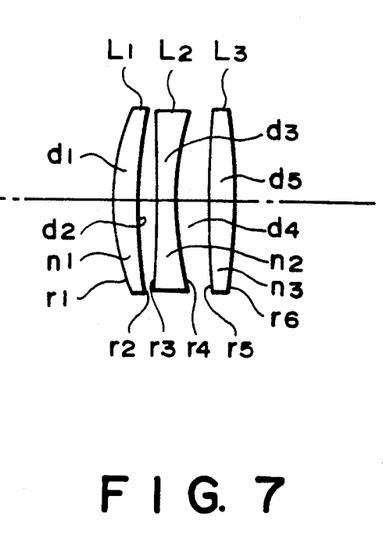

(Embodiment 7)
f = 100 y = 17.5 ENP = 0~ −0.2 f

| | | | |
|---|---|---|---|
| r1 = 12.02 | | | |
| | d1 = 1.5 | n1 = 1.51823 | V1 = 58.9 |
| r2 = 30.63 | | | |
| | d2 = 1.0 | | |
| r3 = −107.00 | | | |
| | d3 = 1.0 | n2 = 1.61266 | V2 = 44.4 |
| r4 = 14.72 | | | |
| | d4 = 2.0 | | |
| r5 = 58.50 | | | |
| | d5 = 1.5 | n3 = 1.61728 | V3 = 54.0 |
| r6 = −35.68 | | | |
| | Σd = 7.0 | | |

Figure 8:
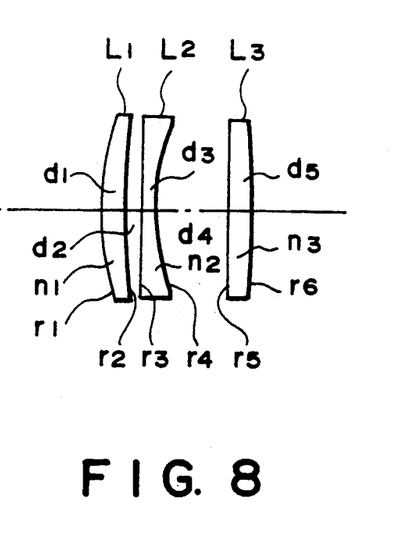

(Embodiment 8)
f = 100 y = 17.5 ENP = 0~ −0.3 f

| | | | |
|---|---|---|---|
| r1 = 13.10 | | | |
| | d1 = 1.5 | n1 = 1.62299 | V1 = 58.22 |
| r2 = 50.33 | | | |
| | d2 = 0.77 | | |
| r3 = 391.1 | | | |
| | d3 = 1.0 | n2 = 1.61266 | V2 = 44.41 |
| r4 = 13.22 | | | |
| | d4 = 4.0 | | |
| r5 = 122.10 | | | |
| | d5 = 1.5 | n3 = 1.62299 | V3 = 58.22 |
| r6 = −57.28 | | | |
| | Σd = 8.77 | | |

Figure 9:
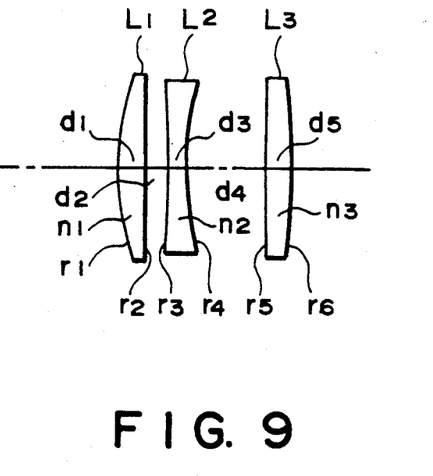

(Embodiment 9)
f = 100 y = 17.5 ENP = 0~ −0.3 f

| | | | |
|---|---|---|---|
| r1 = 15.55 | | | |
| | d1 = 1.5 | n1 = 1.51823 | V1 = 58.9 |
| r2 = ∞ | | | |
| | d2 = 1.55 | | |
| r3 = −63.3 | | | |
| | d3 = 1.0 | n2 = 1.61266 | V2 = 44.4 |
| r4 = 17.85 | | | |
| | d4 = 4.5 | | |
| r5 = ∞ | | | |
| | d5 = 1.5 | n3 = 1.6228 | V3 = 57.03 |
| r6 = −35.44 | | | |
| | Σd = 10.05 | | |

Figure 10:
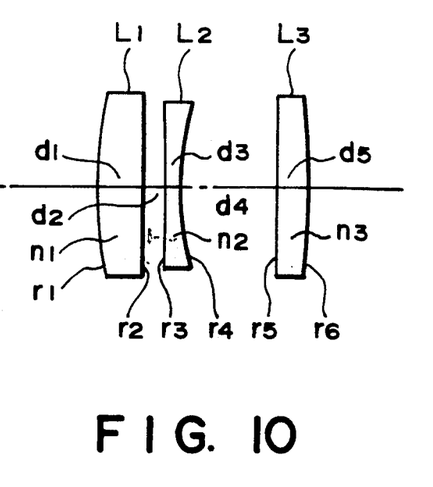

(Embodiment 10)
f = 100 y = 17.5 ENP = 0~ −0.3 f

| | | | |
|---|---|---|---|
| r1 = 16.39 | | | |
| | d1 = 2.90 | n1 = 1.61272 | V1 = 58.54 |
| r2 = −980.0 | | | |
| | d2 = 1.4 | | |
| r3 = −69.5 | | | |
| | d3 = 0.7 | n2 = 1.54814 | V2 = 45.87 |
| r4 = 15.28 | | | |
| | d4 = 5.54 | | |
| r5 = ∞ | | | |
| | d5 = 1.8 | n3 = 1.5168 | V3 = 64.1 |
| r6 = −44.64 | | | |
| | Σd = 12.34 | | |

Figure 11:
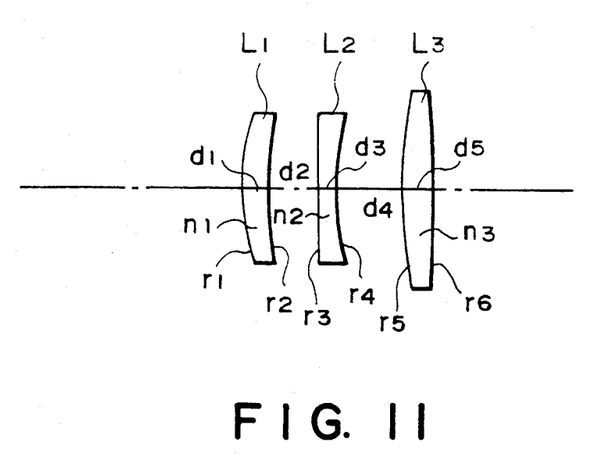

(Embodiment 11)
f = 100 y = 16 ENP = −0.15 f~0.15 f

| | | | |
|---|---|---|---|
| r1 = 12.495 | | | |
| | d1 = 1.5 | n1 = 1.72342 | V1 = 37.88 |
| r2 = 18.957 | | | |
| | d2 = 2.85 | | |
| r3 = −285.7 | | | |
| | d3 = 1.0 | n2 = 1.6727 | V2 = 32.17 |
| r4 = 14.443 | | | |
| | d4 = 4.0 | | |
| r5 = 36.800 | | | |
| | d5 = 1.5 | n3 = 1.74443 | V3 = 49.52 |
| r6 = −60.786 | | | |
| | Σd = 10.85 | | |

Figure 12:
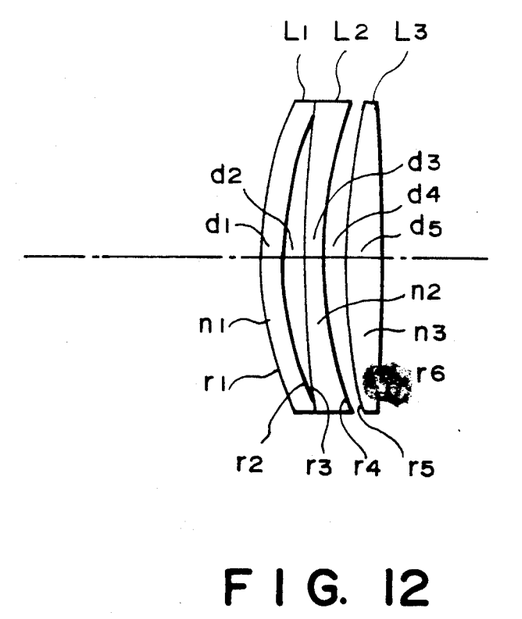

(Embodiment 12)
f = 100 y = 11 ENP −0.2 f~ −0.6 f

| | | | |
|---|---|---|---|
| r1 = 17.79 | | | |
| | d1 = 1.4 | n1 = 1.72342 | V1 = 37.88 |
| r2 = 22.66 | | | |
| | d2 = 1.2 | | |
| r3 = 93.24 | | | |
| | d3 = 0.9 | n2 = 1.6727 | V2 = 32.17 |
| r4 = 21.20 | | | |
| | d4 = 1.5 | | |
| r5 = 39.60 | | | |
| | d5 = 2.0 | n3 = 1.74810 | V3 = 52.28 |
| r6 = −141.53 | | | |
| | Σd = 7.0 | | |

The infinity system imaging optical system according to the present invention, in spite of the assembly length of its second objective lens being small and the entrance pupil thereof lying forwardly of the lens, is substantially an anastigmat, and particularly the meridional image plane thereof is well corrected. Therefore, the fluctuations of various aberrations for the fluctuation of the entrance pupil are small. This property leads to the advantage that for example, where the infinity system imaging optical system of the present invention is used as an objective lens for a microscope of the infinity type, the space required by the second objective lens is small and therefore the space for the insertion of other necessary members, for example, a filter, a half-mirror for downward illumination and other optical members become greater and the movement space for the focus adjustment of the second objective lens can be provided sufficiently. Also, even when the spacing between the first objective lens and the second objective lens is varied for focus adjustment, coma and the meridional image plane are well corrected, and this leads to the advantage that the aberrational fluctuation of image is small. This property is a property vary advantageous when the infinity system imaging optical system of the present invention is used not only in a microscope, but also as a part of a system in which light rays need be drawn around. Further, if the optical system of the present invention is applied to a factory microscope, a projector or other optical measuring apparatus and is designed such that only the first objective lens thereof is moved to effect focusing, it will be very advantageous to the simplification of mechanical structure and improvement in accuracy.

What is claimed is:

1. An imaging optical system having a first objective lens movable along the optical axis thereof for focus adjustment and for forming the image of an object at infinity, and a second objective lens for forming said image again at a predetermined position at a predetermined magnification, said second objective lens comprising, in succession from the object side, a positive single lens, a negative single lens and a positive single lens disposed with an air space therebetween, and satisfying the following conditions:

0.05 f < Σd < 0.14 f 0.1 f < |r_M| < 0.35 f 0.1 f < D < 0.11 f where f is the focal length of said second objective lens, Σd is the assembly length of said second objective lens, $r_M$ is the radius of curvature of that surface of the lenses constituting said second objective lens which has the greatest positive power, and D is the total of the air spaces between the two positive single lenses and middle negative single lens of said second objective lens.

2. An imaging optical system according to claim 1, wherein said second objective lens has a numerical aperture of 0.05 or less and a half angle of view of 10° or less.

3. An imaging optical system according to claim 1, wherein numerical data are as follows:

| f = 100 y = 10.5 ENP = 0∼ −0.2 f | | | |
|---|---|---|---|
| r1 = 28.7 | | | |
| | d1 = 1.5 | n1 = 1.744 | V1 = 45.0 |
| r2 = 136.2 | | | |
| | d2 = 3.83 | | |
| r3 = −40.29 | | | |
| | d3 = 1.0 | n2 = 1.6727 | V2 = 32.17 |
| r4 = 40.29 | | | |
| | d4 = 3.83 | | |
| r5 = −136.2 | | | |
| | d5 = 1.5 | n3 = 1.744 | V3 = 45.0 |
| r6 = −28.7 | | | |
| Σd = 11.66 | | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

4. An imaging optical system according to claim 1, wherein numerical data are as follows:

| f = 100 y = 10.5 ENP = 0∼ −0.3 f | | | |
|---|---|---|---|
| r1 = 29.66 | | | |
| | d1 = 1.5 | n1 = 1.6223 | V1 = 53.05 |
| r2 = 110.45 | | | |
| | d2 = 3.9 | | |
| r3 = −28.39 | | | |
| | d3 = 1.0 | n2 = 1.57501 | V2 = 41.42 |
| r4 = 45.07 | | | |
| | d4 = 3.02 | | |
| r5 = −1023.8 | | | |
| | d5 = 1.5 | n3 = 1.62041 | V3 = 60.14 |
| r6 = −238.56 | | | |
| Σd = 10.92 | | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

5. An imaging optical system according to claim 1, wherein numerical data are as follows:

| f = 100 y = 10.5 ENP = 0∼ −0.25 f | | | |
|---|---|---|---|
| r1 = 28.3 | | | |
| | d1 = 1.5 | n1 = 1.62299 | V1 = 58.22 |
| r2 = 119.3 | | | |
| | d2 = 2.87 | | |
| r3 = −17.19 | | | |
| | d3 = 1.0 | n2 = 1.61266 | V2 = 44.41 |
| r4 = 72.28 | | | |
| | d4 = 1.18 | | |
| r5 = −94.2 | | | |
| | d5 = 1.5 | n3 = 1.62299 | V3 = 58.22 |
| r6 = −15.29 | | | |
| Σd = 8.05 | | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

6. An imaging optical system according to claim 1, further numerical data are as follows:

| f = 100 y = 10.5 ENP = 0∼ −0.3 f | | | |
|---|---|---|---|
| r1 = 14.05 | | | |
| | d1 = 1.5 | n1 = 1.51823 | V1 = 58.9 |
| r2 = 27.45 | | | |
| | d2 = 1.99 | | |
| r3 = −56.18 | | | |
| | d3 = 1.0 | n2 = 1.61266 | V2 = 44.41 |
| r4 = 18.7 | | | |
| | d4 = 1.6 | | |
| r5 = 46.6 | | | |
| | d5 = 1.5 | n3 = 1.6228 | V3 = 57.03 |
| r6 = −31.9 | | | |
| Σd = 7.59 | | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

7. An imaging optical system according to claim 1, wherein numerical data are as follows:

| f = 100 y = 10.5 ENP = 0∼ −0.3 f | | | |
|---|---|---|---|
| r1 = 20.06 | | | |
| | d1 = 1.5 | n1 = 1.6223 | V1 = 53.05 |
| r2 = 40.63 | | | |
| | d2 = 4.0 | | |
| r3 = −32.32 | | | |
| | d3 = 1.0 | n2 = 1.61266 | V2 = 44.41 |
| r4 = 25.09 | | | |
| | d4 = 1.51 | | |
| r5 = 44.46 | | | |
| | d5 = 1.5 | n3 = 1.51835 | V3 = 60.23 |
| r6 = −22.28 | | | |
| Σd = 9.51 | | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

8. An imaging optical system according to claim 1, wherein numerical data are as follows:

| f = 100 y = 10.5 ENP = 0~ −0.2 f | | | |
|---|---|---|---|
| r1 = 34.42 | | | |
| | d1 = 1.5 | n1 = 1.6228 | V1 = 57.03 |
| r2 = −55.11 | | | |
| | d2 = 1.97 | | |
| r3 = −17.53 | | | |
| | d3 = 1.0 | n2 = 1.61266 | V2 = 44.41 |
| r4 = 64.18 | | | |
| | d4 = 1.95 | | |
| r5 = −32.39 | | | |
| | d5 = 1.5 | n3 = 1.51835 | V3 = 60.23 |
| r6 = −13.62 | | | |
| | Σd = 7.92 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

9. An imaging optical system according to claim 1, wherein numerical data are as follows:

| f = 100 y = 17.5 ENP = 0~ −0.2 f | | | |
|---|---|---|---|
| r1 = 12.02 | | | |
| | d1 = 1.5 | n1 = 1.51823 | V1 = 58.9 |
| r2 = 30.63 | | | |
| | d2 = 1.0 | | |
| r3 = −107.00 | | | |
| | d3 = 1.0 | n2 = 1.61266 | V2 = 44.4 |
| r4 = 14.72 | | | |
| | d4 = 2.0 | | |
| r5 = 58.50 | | | |
| | d5 = 1.5 | n3 = 1.61728 | V3 = 54.0 |
| r6 = −35.68 | | | |
| | Σd = 7.0 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

10. An imaging optical system according to claim 1, wherein numerical data are as follows:

| f = 100 y = 17.5 ENP = 0~ −0.3 f | | | |
|---|---|---|---|
| r1 = 13.10 | | | |
| | d1 = 1.5 | n1 = 1.62299 | V1 = 58.22 |
| r2 = 50.33 | | | |
| | d2 = 0.77 | | |
| r3 = 391.1 | | | |
| | d3 = 1.0 | n2 = 1.61266 | V2 = 44.41 |
| r4 = 13.22 | | | |
| | d4 = 4.0 | | |

-continued

| f = 100 y = 17.5 ENP = 0~ −0.3 f | | | |
|---|---|---|---|
| r5 = 122.10 | | | |
| | d5 = 1.5 | n3 = 1.62299 | V3 = 58.22 |
| r6 = −57.28 | | | |
| | Σd = 8.77 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

11. An imaging optical system according to claim 1, wherein numerical data are as follows:

| f = 100 y = 17.5 ENP = 0~ −0.3 f | | | |
|---|---|---|---|
| r1 = 15.55 | | | |
| | d1 = 1.5 | n1 = 1.51823 | V1 = 58.9 |
| r2 = ∞ | | | |
| | d2 = 1.55 | | |
| r3 = −63.3 | | | |
| | d3 = 1.0 | n2 = 1.61266 | V2 = 44.4 |
| r4 = 17.85 | | | |
| | d4 = 4.5 | | |
| r5 = ∞ | | | |
| | d5 = 1.5 | n3 = 1.6228 | V3 = 57.03 |
| r6 = −35.44 | | | |
| | Σd = 10.05 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

12. An imaging optical system according to claim 1, wherein numerical data are as follows:

| f = 100 y = 17.5 ENP = 0~ −0.3 f | | | |
|---|---|---|---|
| r1 = 16.39 | | | |
| | d1 = 2.90 | n1 = 1.61272 | V1 = 58.54 |
| r2 = −980.0 | | | |
| | d2 = 1.4 | | |
| r3 = −69.5 | | | |
| | d3 = 0.7 | n2 = 1.54814 | V2 = 45.87 |
| r4 = 15.28 | | | |
| | d4 = 5.54 | | |
| r5 = ∞ | | | |
| | d5 = 1.8 | n3 = 1.5168 | V3 = 64.1 |
| r6 = −44.64 | | | |
| | Σd = 12.34 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

13. An image optical system according to claim 1, wherein numerical data are as follows:

| f = 100 y = 16 ENP = −0.15 f ~ 0.15 f | | | |
|---|---|---|---|
| r1 = 12.495 | | | |
| | d1 = 1.5 | n1 = 1.72342 | V1 = 37.88 |
| r2 = 18.957 | | | |
| | d2 = 2.85 | | |
| r3 = −285.7 | | | |
| | d3 = 1.0 | n2 = 1.6727 | V2 = 32.17 |
| r4 = 14.443 | | | |
| | d4 = 4.0 | | |
| r5 = 36.800 | | | |
| | d5 = 1.5 | n3 = 1.74443 | V3 = 49.52 |
| r6 = −60.786 | | | |
| | Σd = 10.85 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

14. An imaging optical system according to claim 1, wherein numerical data are as follows:

| f = 100 y = 11 ENP = −0.2 f ~ −0.6 f | | | |
|---|---|---|---|
| r1 = 17.79 | | | |
| | d1 = 1.4 | n1 = 1.72342 | V1 = 37.88 |
| r2 = 22.66 | | | |
| | d2 = 1.2 | | |
| r3 = 93.24 | | | |
| | d3 = 0.9 | n2 = 1.6727 | V2 = 32.17 |
| r4 = 21.20 | | | |
| | d4 = 1.5 | | |
| r5 = 39.60 | | | |
| | d5 = 2.0 | n3 = 1.74810 | V3 = 52.28 |
| r6 = −141.53 | | | |
| | Σd = 7.0 | | | where f represents the focal length, y represents the image height, ENP represents the entrance pupil position from the vertex of the first lens surface (the direction of travel of light is positive), r represents the radius of curvature of each lens surface, d represents the spacing between adjacent lens surfaces, and n and V represent the refractive index and Abbe number, respectively, for d-line.

* * * * *